(12) United States Patent
Gaiha et al.

(10) Patent No.: US 9,483,834 B1
(45) Date of Patent: Nov. 1, 2016

(54) OBJECT BOUNDARY DETECTION IN AN IMAGE

(71) Applicant: Adobe Systems Incorporated, San Jose, CA (US)

(72) Inventors: Abhijeet Gaiha, New Delhi (IN); Ram Bhushan Agrawal, Noida (IN); Anand Kumar, Ranchi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/717,081

(22) Filed: May 20, 2015

(51) Int. Cl.
| | |
|---|---|
| *G06K 9/48* | (2006.01) |
| *G06T 7/00* | (2006.01) |
| *G06T 5/00* | (2006.01) |
| *G06T 7/40* | (2006.01) |

(52) U.S. Cl.
CPC ............... *G06T 7/0083* (2013.01); *G06K 9/48* (2013.01); *G06T 5/001* (2013.01); *G06T 7/0085* (2013.01); *G06T 7/408* (2013.01); *G06T 2207/10024* (2013.01); *G06T 2207/20024* (2013.01); *G06T 2207/20136* (2013.01); *G06T 2207/20192* (2013.01); *G06T 2207/30176* (2013.01)

(58) Field of Classification Search
CPC ............... G06T 7/0083; G06T 7/0085; G06T 2207/10016; G06T 5/001; G06K 9/48
See application file for complete search history.

(56) References Cited

U.S. PATENT DOCUMENTS

| | | | | |
|---|---|---|---|---|
| 7,051,937 | B2 * | 5/2006 | Albertelli | G06K 7/14 235/462.25 |
| 8,098,334 | B2 * | 1/2012 | Huang | G06T 3/403 348/625 |
| 8,294,781 | B2 * | 10/2012 | Cote | H04N 5/208 348/222.1 |
| 8,417,012 | B2 * | 4/2013 | Ramirez | G01N 15/1031 382/133 |
| 8,704,945 | B1 * | 4/2014 | Xin | H04N 7/012 348/452 |

OTHER PUBLICATIONS

Ma,"EdgeFlow: A Technique for Boundary Detection and Image Segmentation", Image Processing, IEEE Transactions on (vol. 9 , Issue: 8 ), Aug. 2000, 30 pages.

* cited by examiner

*Primary Examiner* — Amir Alavi
(74) *Attorney, Agent, or Firm* — Wolfe-SBMC

(57) ABSTRACT

Object boundary detection techniques are described. In implementations, edges of an object displayed in an image are detected. The image is used to generate a gradient image and a monochrome image. Directional filters are applied to the monochrome image to generate directionally filtered images, which are then applied the gradient image to identify potential boundary lines of the object displayed in the image. A selection can then be made from the potential boundary lines, based on a score associated with each respective potential boundary line, to select lines to represent the boundaries of the object. The selected lines can be used to segment the image into a plurality of segments, and then, using the average color of each segment, one or more of the selected lines can be invalidated as being a false boundary.

20 Claims, 11 Drawing Sheets

OBJECT BOUNDARY DETECTION IN AN IMAGE

BACKGROUND

Users encounter a variety of documents on a daily basis such as bills, tickets, letters, notebook pages, financial statements, and so on. Managing these physical documents can be cumbersome and may require a substantial amount of physical storage over time. With advances in digital technology, users can convert these physical documents into digital files by scanning the documents to reduce physical storage requirements and better manage the documents. A further development is the proliferation of mobile devices, such as smartphones, that have an integrated camera that allows a user to photograph a document and store the photograph as a digital file. These mobile devices are being increasingly used as the device of choice for converting physical documents to a digital format.

Conventional techniques used by mobile devices to capture an image of a document, however, can be problematic. For instance, when capturing an image a document with a camera, background clutter may be included in the image. To remove the background clutter and keep only the document in the image, the document in the image must be separated from the background clutter. Conventional techniques used by mobile devices that have limited processing capabilities typically lack this complex functionality to separate foreground objects (e.g., the document) from the background clutter to allow the background clutter to be removed from the image. Consequently, the quality of the captured image is reduced and the user is forced to manually trace boundaries of the document in the image to apply a crop operation that removes portions of the image that lie outside the traced boundaries of the document, such as the background clutter. Further complications can arise when the document is photographed at an angle instead of directly from the top of the document, resulting in an incorrect perspective of the document and not eliminating the background completely even manually or even if eliminating the background completely manually then still chopping off some portion of the document. Accordingly, conventional techniques are laden with complications and inefficiencies that can result in significant inaccuracies.

SUMMARY

Techniques for object boundary detection in an image are described. In one or more implementations, edges of an object, such as a document, displayed in an image are detected. In implementations, the image is used to generate a gradient image and a monochrome image. Directional filters are applied to the monochrome image to generate directionally filtered images, which are then applied to the gradient image to identify potential boundary lines of the object displayed in the image. A selection can then be made from these potential boundary lines, based on a score associated with each respective potential boundary line, to select lines to represent the boundaries of the object displayed in the image. In one or more implementations, the score represents a likelihood that a potential boundary line is an edge of the object displayed in the image.

Occasionally, when capturing an image of an object, one or more of edges of the object can be cut off in the image. Accordingly, each selected line is evaluated identify any false boundaries. In implementations, the selected lines can be used to segment the image into multiple segments. Then, using the average color of each segment, one or more of the selected lines can be invalidated as being a false boundary. The boundaries can then be used for any of a variety of image editing operations, such as crop, cut, copy, and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
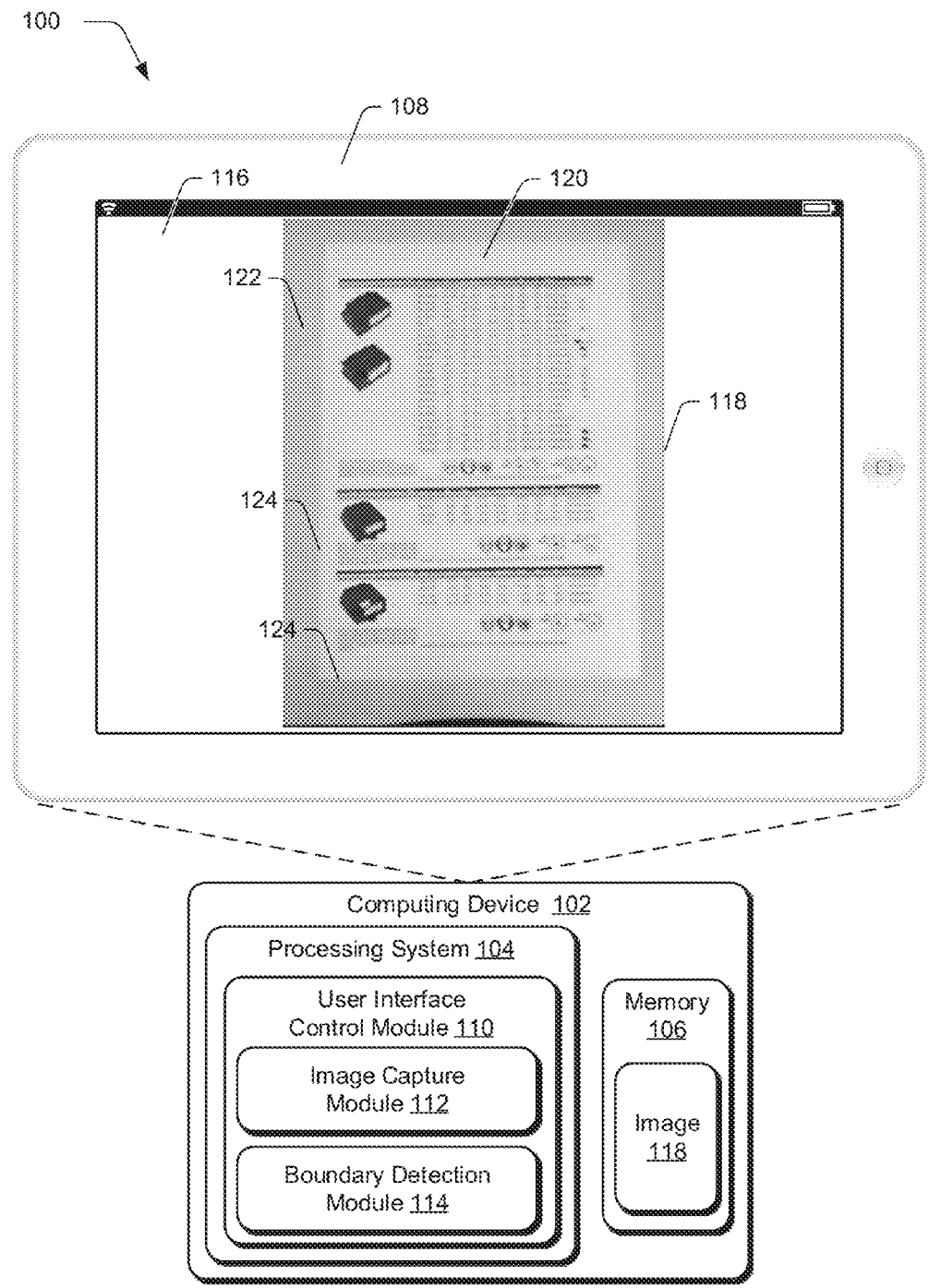
FIG. 1 is an illustration of an environment in an example implementation that is operable to employ the object boundary detection techniques described herein.

Conventional techniques used to detect boundaries of an object displayed in an image required error-prone user selection of the object's boundaries to perform an image editing operation, such as a crop operation to remove background clutter. The inaccuracies of these conventional techniques are often further exacerbated due to an incorrect perspective of the object when the image is captured with a camera. For example, a user can use the camera to capture an image of a document at an angle such that the boundaries of the document are not aligned or parallel with the edges of the image.

Techniques for object boundary detection in an image are described. In implementations, a series of image filters are used to identify a pool of potential boundary lines of the object in the image and remove some lines that are not likely to be boundaries of the object. These potential boundary lines are then analyzed and scored to further reduce the pool of potential boundary lines and identify a set of lines to represent the object's boundaries. Additionally, to ensure that the identified boundary lines are true boundaries of the object, the identified boundary lines are used to divide the image into segments that can be compared to one another based on each segment's average pixel color. Using the average color of each segment, falsely identified boundary lines can be removed for increased accuracy of the object boundary detection in the image.

In one or more implementations, a single-input solution is employed to detect the boundaries of an object displayed in an image. For instance, the user may use a smartphone to capture an image of an object, such as a paper document. The object can represent any of a variety of physical objects that include any of a variety of shapes or forms. An example object includes a document having a substantially quadrilateral shape, such as a bill, a ticket, a financial statement, a letter, and so on. The document can be formed from any of a variety of mediums, such as paper, a billboard, a whiteboard, a chalkboard, and so on. In implementations, the document includes text, images, and/or other content written, printed, or otherwise drawn thereon.

An edge detection filter can be applied to the image to generate a gradient image, and the gradient image can be converted into a monochrome image. Then, directional filters, such as vertical and/or horizontal filters, can be applied to the monochrome image to generate directionally filtered images that each have lines corresponding to the direction of the applied directional filter. For example, applying the vertical filter can result in a directionally filtered image having mostly vertical lines while applying the horizontal filter can result in a directionally filtered image having mostly horizontal lines.

The directionally filtered images can then be applied to the gradient image to identify potential boundary lines of the object displayed in the image. In one example, by using the vertically and horizontally filtered images, a transform algorithm can be constrained to search only those areas of the gradient image that correspond to the vertical and horizontal lines. Once potential boundary lines are identified, scores (also referred to herein as "ratings") can be assigned to each potential boundary line to represent a likelihood that the potential boundary line is indeed an edge of the object displayed in the image. The scores are based on a variety of factors that are described in detail below.

The highest scoring lines can then be selected and associated with the original image to segment the image into multiple segments. For example, if the object is a quadrilateral-shaped document, four lines can be selected as estimates of each of the four sides of the document in the image, and those selected lines can be associated with the image (and extended to the edges of the image) to segment the image into nine sections. An average color of each segment can then be determined and used to invalidate some of the selected lines as false boundaries, such as a selected or potential boundary that turns out not to be a boundary of the object or document in the image. For example, a line drawn or printed on the object could be mistakenly identified as the boundary of the object. If a false boundary is identified, then the edge of the image can be used as the boundary of the object in the image, based on an assumption that a portion of the object was cut off when the image of the object was captured. In this way, boundaries of an object displayed in an image can be accurately and automatically detected, and false boundaries can be invalidated. A variety of image editing operations can then be employed based on the detected boundaries, such as operations to crop, cut, copy, move, and so on to remove background clutter. Further discussion of these and other examples are described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ object boundary detection techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Additionally, although a single computing device 102 is shown, the computing device 102 may be representative of a plurality of different devices, such as multiple servers utilized by a business to perform operations "over the cloud" as further described in relation to FIG. 11.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The processing system 104 is illustrated as executing a user interface control module 110, an image capture module 112, and a boundary detection module 114, all of which are storable in the memory 106 and as such are implemented at least partially in hardware. The user interface control module 110, image capture module 112, and the boundary detection module 114 are executable by the processing system 104 to cause performance of one or more operations. Other implementations are also contemplated, such as implementation as dedicated hardware components, e.g., application specific integrated circuit, fixed-logic circuitry, and so forth.

The user interface control module 110 is representative of functionality of the computing device 102 to generate and manage interaction with a user interface 116 displayed by the display device 108. For example, a user may use a keyboard, cursor control device, gesture detected by touchscreen functionality of the display device 108, verbal utterance, and so on to interact with text or other objects displayed as part of an image 118 by the display device 108. The image 118 can be any of a variety of digital images, such as an image captured with a digital camera, mobile phone, tablet, and so on. The image 118 can include a variety of different objects, such as text, shapes or other visual objects, spreadsheets, a document, a multimedia content, a slide presentation, and so on.

The image capture module 112 is representative of functionality of the computing device 102 to capture images and/or video using a camera, a scanner, or other image capturing device. For example, the user may take a photograph of a paper document 120 displayed by the user interface 116 using a camera integrated with the computing device 102. Then the captured photograph can be stored in the memory 106 as an image 118. Frequently, when users capture a photograph of an object such as the paper document 120, the photograph also includes background 122 that is undesirable for inclusion in the photograph. Removing the background 122 can therefore improve the quality of the photograph.

The boundary detection module 114 is representative of functionality to aid detection of boundaries of objects within the image 118 displayed in the user interface 116, such as boundaries 124. The boundary detection module 114 does this through a series of operations that identify potential boundary lines corresponding to the edges of the object, and invalidate false boundary lines from the potential boundary lines. In this way, the boundary detection module 114 can be used to automatically and efficiently detect valid boundaries of objects in the image 118. In order to detect boundaries of the document 120 in the illustrated example of the image 118 in the user interface 116, conventional techniques required numerous user inputs to draw detailed lines along the borders of the document 120. The problem is further exacerbated in touch inputs due to reduced accuracy of the inputs. Additionally, capturing a photograph of a document can often result in perspective distortion due to the document being photographed at an angle. Thus, conventional techniques used to perform object boundary detection could be tedious, inaccurate, and frustrating.

The boundary detection module 114, on the other hand, is configured to automatically detect boundaries of an object in an image without requiring user interaction. The boundary detection module 114 can detect boundaries of the object in a way that is computationally inexpensive for underpowered devices, such as mobile phones in comparison to desktop computers, that can easily perform the operation. Further detail of the functionalities of the boundary detection module 114 are described in the following and shown in corresponding figures.

Example Implementation

The following discussion describes example implementations of object boundary detection that can be employed to perform various aspects of techniques discussed herein. The example implementations may be employed in the environment 100 of FIG. 1, the system 1100 of FIG. 11, and/or any other suitable environment.

Figure 2:
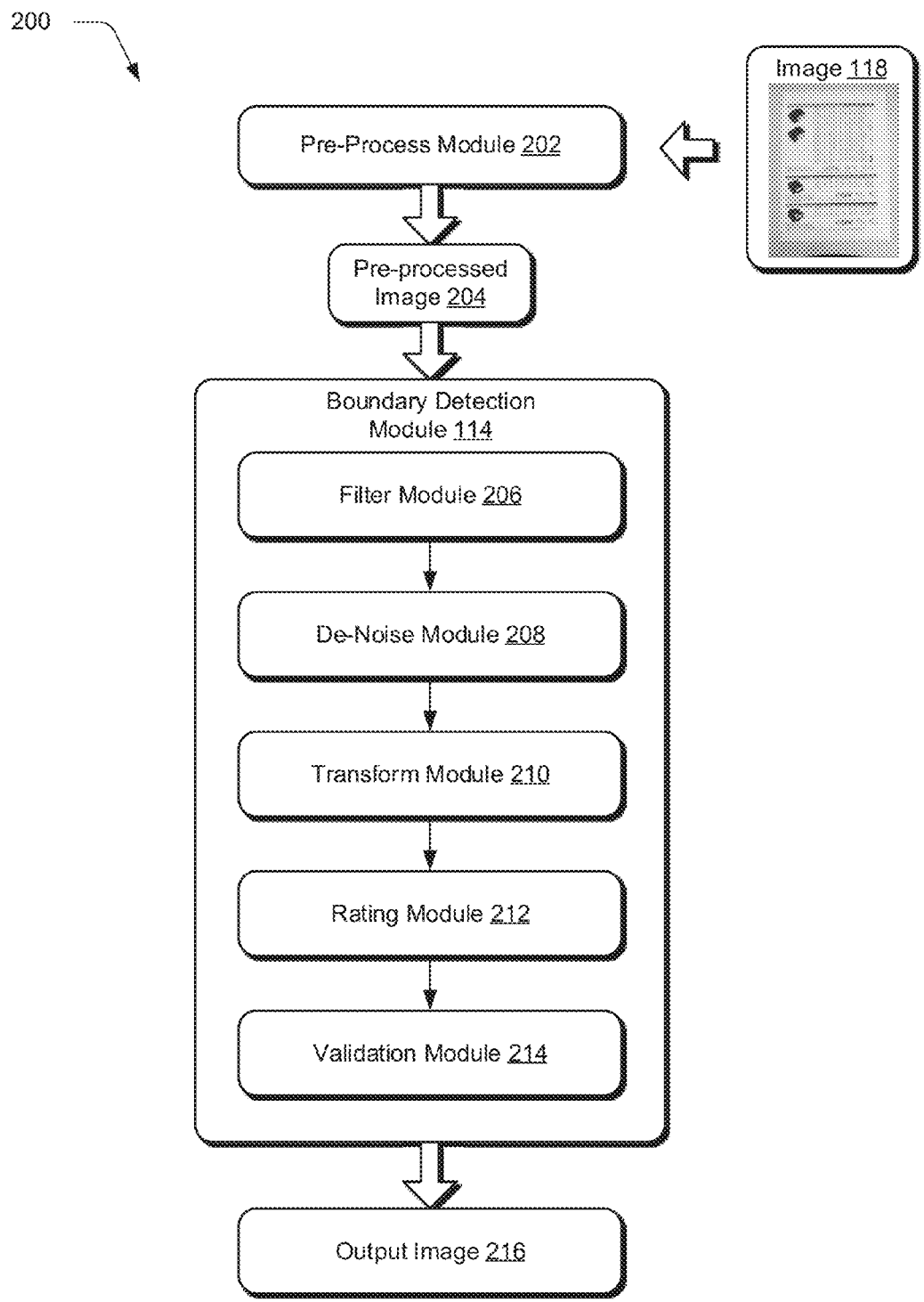
FIG. 2 depicts a system in an example implementation showing operation of a boundary detection module of FIG. 1 in greater detail.

FIG. 2 depicts a system 200 in an example implementation that is operable to employ techniques for object boundary detection in an image. The illustrated system 200 includes a pre-process module 202 that performs a series of operations on the image 118 that was obtained by the computing device 102 in FIG. 1, further discussion of which is provided below in more detail and illustrated in FIG. 3. The pre-process module 202 converts the image 118 into a pre-processed image 204 that is usable by the boundary detection module 114 from FIG. 1 to detect boundaries of an object in the image 118.

The boundary detection module 114 is illustrated as including a filter module 206, a de-noise module 208, a transform module 210, a rating module 212, and a validation module 214. These modules can be used by the boundary detection module 114 of the computing device 102 to detect boundaries of the object in the image, invalidate false boundaries, and provide an output image 216 that has the boundaries of the object detected and defined to enable additional operations to be performed such as crop, copy, cut, move, perspective correction, and so on. Further discussion of the various modules and other aspects are provided in further detail below and illustrated in FIGS. 4-8.

Figure 3:
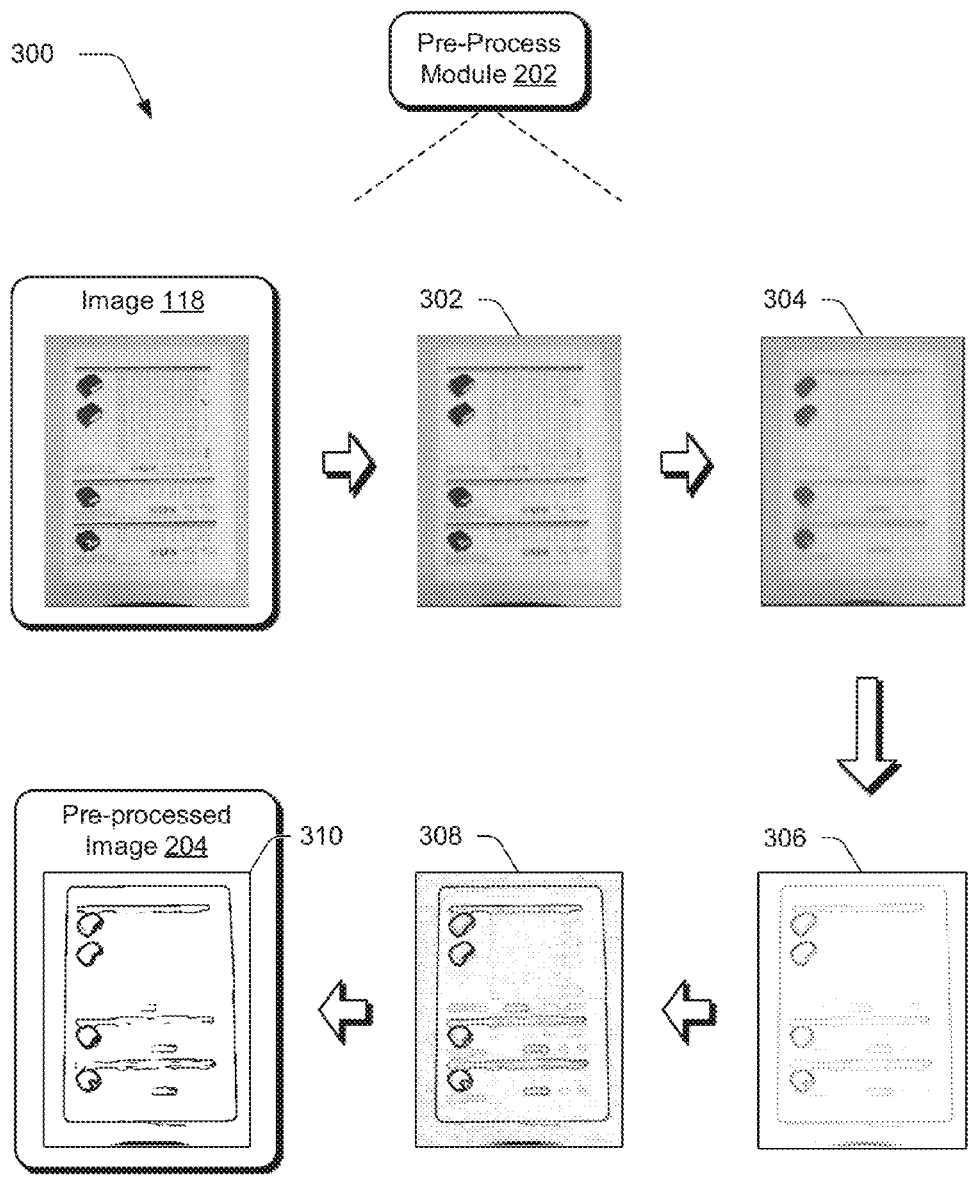
FIG. 3 depicts an example implementation of functionalities represented by a pre-process module of FIG. 2 to pre-process the image obtained by the computing device of FIG. 1.

FIG. 3 illustrates an example implementation 300 of functionalities represented by the pre-process module of FIG. 2 to pre-process the image 118 obtained by the computing device 102 of FIG. 1. The image 118 can be down sampled to resize the image 118 to an optimal size. For example, many mobile devices can capture images that are 5 megapixels, 8 megapixels, and so on. For reasons of efficiency, speed, and accuracy, the image is down sampled to produce a down sampled image 302. Then, a median filter can be applied to the down sampled image 302 to remove relatively small features, such as text or other content that is not likely to correspond to the boundaries of the object in the image 118. In addition, the median filter leaves relatively larger features intact, such as lines that could potentially be the boundaries of the document 120 in the image 118. Applying the median filter provides a filtered image 304, which can then be used to generate a gradient image 306.

The gradient image 306 can be generated by using any of a variety of edge detection filters, such as a Sobel filter. The gradient image 306 represents a greyscale version of the filtered image 304. For example, a greyscale image includes pixels that each have a value in a range of values, such as 0-255. In implementations, a higher gradient corresponds to a greyscale value closer to 255 (e.g., black), while a lower gradient corresponds to a greyscale value closer to zero (e.g., white).

A copy of the gradient image 306 can be stored to enable the gradient image 306 to be used in subsequent operations. The gradient image 306 can then be modified by enhancing the contrast to strengthen the lines in the image and generate an enhanced greyscale image 308. In implementations, enhancing the contrast of the gradient image 306 includes reducing the effect of lesser or lower gradients and strengthening the effect of stronger or higher gradients. The enhanced greyscale image 308 can then be converted to a monochrome image 310 that is output as the pre-processed image 204 of FIG. 2. Accordingly, by converting the enhanced greyscale image 308 to the monochrome image 310, lines corresponding to relatively low gradients are removed while lines that correspond to relatively high gradients remain. In the monochrome image 310, black pixels represent portions of lines while white pixels represent background.

Figure 4:
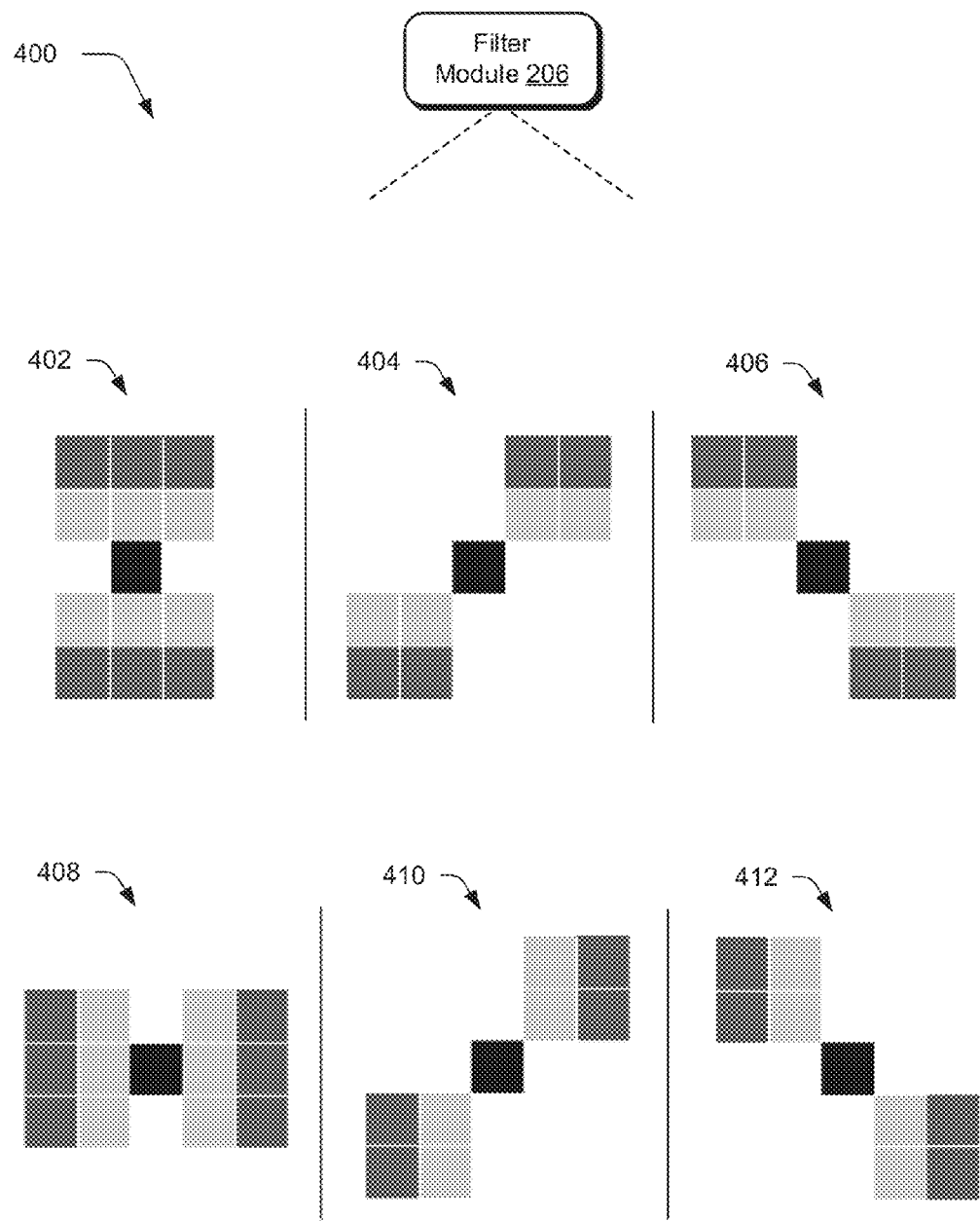
FIG. 4 depicts an example implementation of functionalities represented by a filter module of FIG. 2 to apply directional filters.

FIG. 4 depicts an example implementation 400 of functionalities represented by the filter module 206 of FIG. 2. In implementations, the filter module 206 is configured to apply directional filters to the monochrome image 310 of FIG. 3. Continuing with the above example, the document 120 displayed in the image 118 includes some boundaries that are substantially vertical and some boundaries that are substantially horizontal. However, due to perspective distortion, these boundaries may be partially skewed. Accordingly, a vertical filter and a horizontal filter can be applied to the monochrome image to identify lines that are substantially vertical and/or substantially horizontal. These directional filters are configured to remove lines that have a strong gradient but which are diagonal and therefore not likely to be a boundary of the document 120. However, other directional filters are also contemplated for objects having other shapes and/or orientations within the image.

The vertical filter, for example, is configured to determine if a particular pixel is part of a column of pixels in the monochrome image 310. Further, the vertical filter is configured to determine whether the particular pixel is a central pixel in the column of pixels. For example, for each pixel in the monochrome image 310, the vertical filter determines whether that pixel is white or black. If the current pixel is white, then the vertical filter does nothing more with that pixel. If, however, the current pixel is black, then the current pixel is marked as "not considered." The vertical filter can then evaluate a current black pixel according to at least first and second conditions, where the second condition is based on failure to meet the first condition. For example, the first condition includes a determination of whether at least one pixel is black in the next row above the current pixel and in between columns that are proximate to opposing left and right sides of the current pixel, and whether at least one pixel in the next row below the current pixel, with the same constraints on the columns, is also black. If so, then the current pixel is marked as "considered". If, however, the first condition is not met, then similar conditions are checked in the pixels two rows above and below the current pixel according to the second condition. If this second condition is met, then the current pixel is marked as "considered". Otherwise, the current pixel is marked as "not considered".

Search areas for the above-described conditions are illustrated in FIG. 4 in diagram 402, which represents the current pixel in the center as a black pixel. Additionally, diagram 402 includes complementary search areas for the first condition shaded in light grey (e.g., first row above and below the current pixel), and search areas for the second condition shaded in dark grey (e.g., second row above and below the current pixel). To detect slightly skewed lines, additional search areas are also analyzed. For example, diagram 404 illustrates search areas for a line skewed to the right with two sets of complementary search areas (e.g., light grey shading for the first condition, and dark grey shading for the second condition). Diagram 406 illustrates search areas for a line skewed to the left. Diagrams 408, 410, and 412 illustrate counterpart search areas for the horizontal filter, which operates similarly to the vertical filter, but for substantially horizontal lines.

By utilizing a variety of different search areas for the directional filters, flexibility is maintained when searching for lines in a particular direction. For example, some lines may be dotted or, as described above, slightly skewed. However, the vertical filter can still identify those dots or that skewed line as being a substantially vertical line. Likewise, other directional filters can utilize similar flexibility when identifying lines corresponding to a particular direction.

In implementations, all of the pixels marked as "not considered" by a directional filter are changed to white, effectively removing those pixels from any existing lines. Then, each directional filter provides an output that includes only lines corresponding to the direction of the directional filter. For example, the vertical filter can output a vertically filtered image having only substantially vertical lines, and the horizontal filter can output a horizontally filtered output having only substantially horizontal lines.

Figure 5:
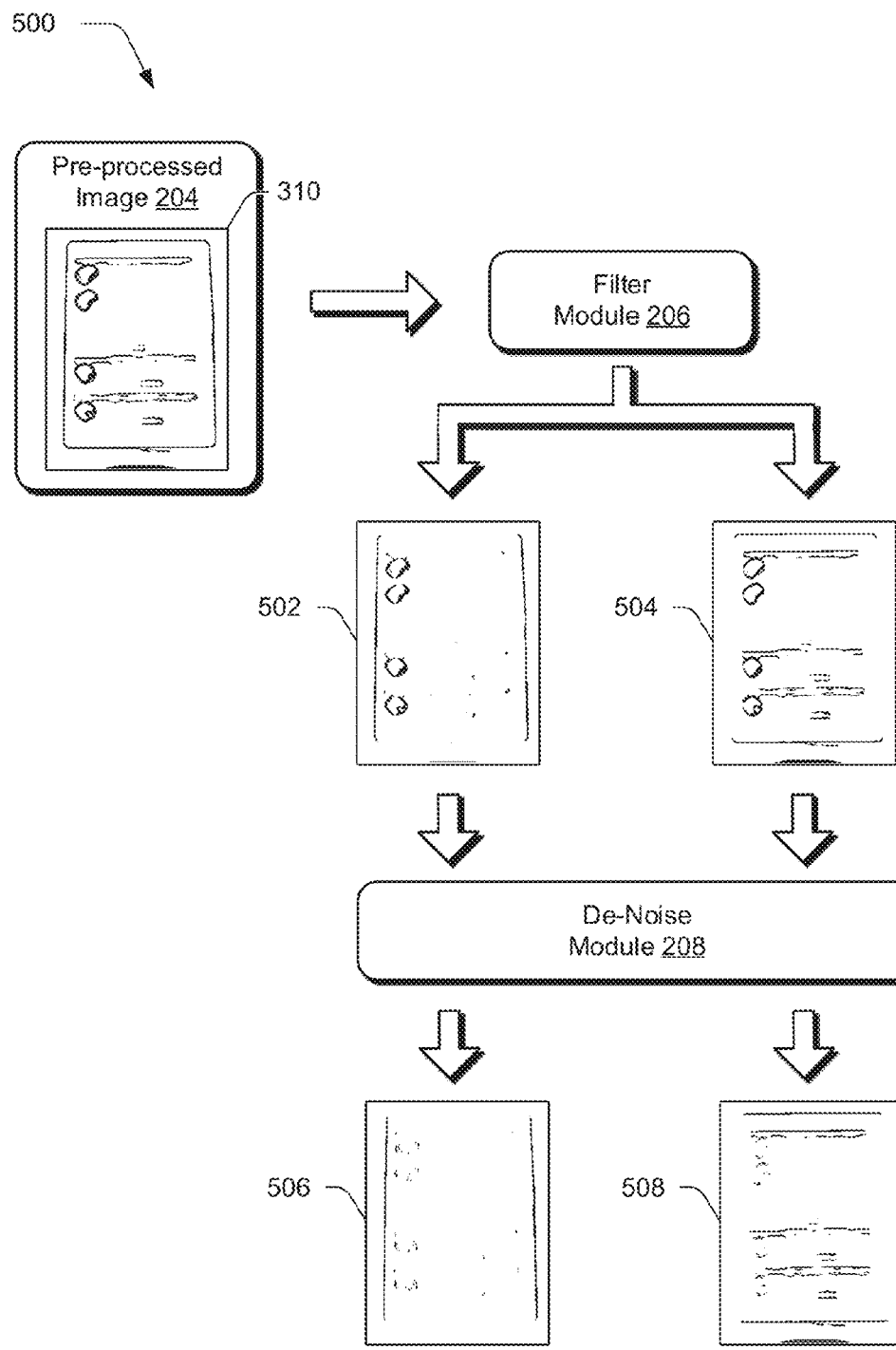
FIG. 5 depicts an example implementation of functionalities represented by the filter module and a de-noise module of FIG. 2 greater detail.

FIG. 5 depicts an example implementation 500 of functionalities represented by the filter module 206 and a de-noise module 208 of FIG. 2. In implementations, the pre-processed image 204 from FIG. 3 is used as input by the filter module 206. As described above, the filter module 206 applies directional filters to the monochrome image 310 that is output as the pre-process image 204, and provides an output for each directional filter applied. In the illustrated example, the filter module 206 has applied a vertical filter to the monochrome image 310 to output a vertically filtered image 502. In addition, the filter module 206 has applied a horizontal filter to the monochrome image 310 to output a horizontally filtered image 504.

Then, the de-noise module 208 de-noises the outputs of the filter module to remove pixels that are common to the outputs. In the illustrated example, the de-noise module 208 is configured to compare the vertically filtered image 502 to the horizontally filtered image 504 to identify black pixels that are common to both of the directionally filtered images. For each pixel in one of the directionally filtered images, a determination is made as to whether a corresponding pixel in the other directionally filtered image is black or white. If the corresponding pixel is white, then the process continues to the next pixel. If, however, the corresponding pixel is black, then both the current pixel and the corresponding pixel are set to white. By removing black pixels that are common to at least two of the directionally filtered images, accuracy of detecting object boundaries in the image is further improved. Accordingly, the de-noise module 208 can provide outputs, such as outputs 506 and 508, that have no common black pixels with one another.

Figure 6:
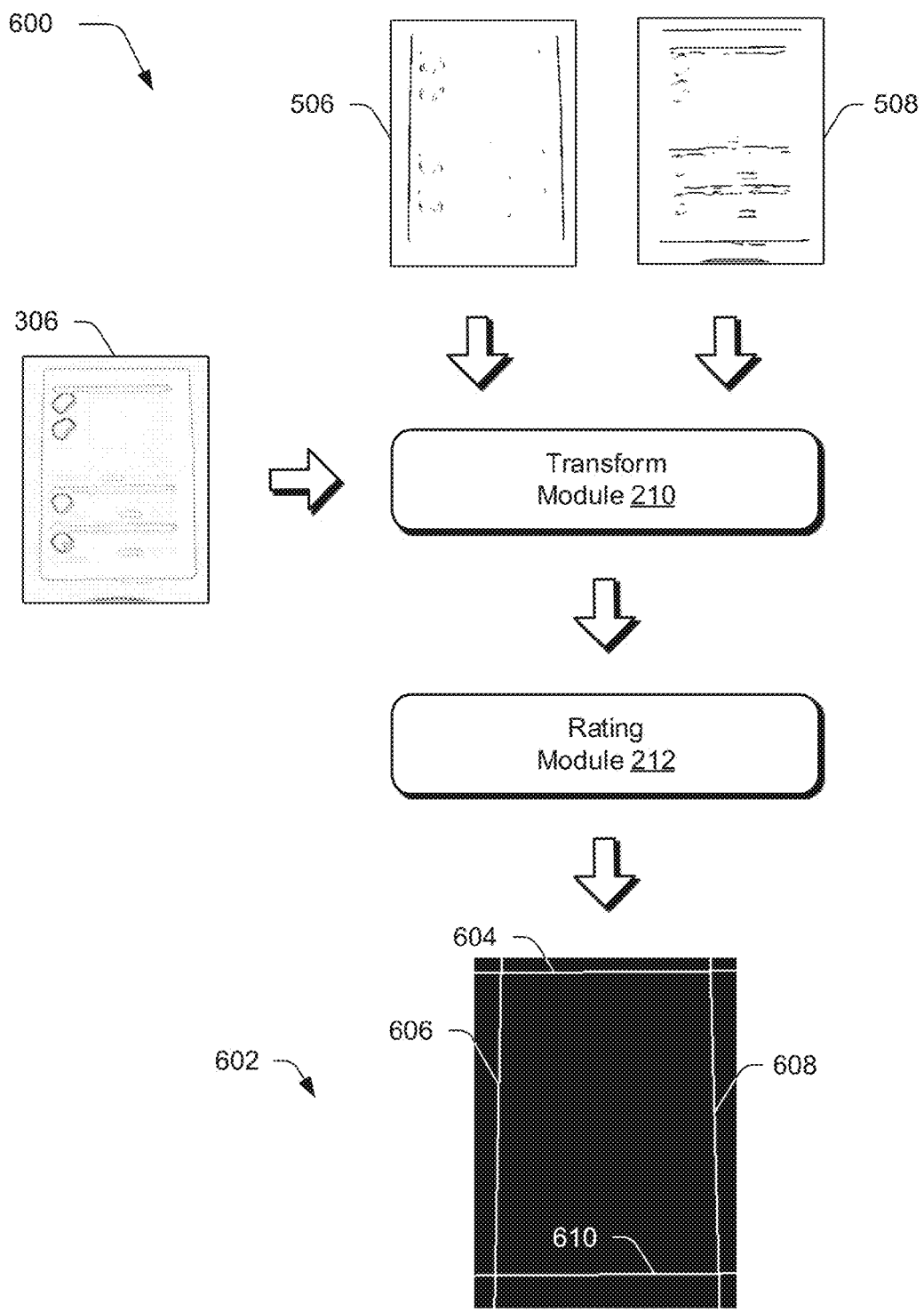
FIG. 6 depicts an example implementation of functionalities of a transform module and a rating module of FIG. 2 to identify and select potential boundary lines of the object displayed in the image.

FIG. 6 depicts an example implementation 600 of functionalities of the transform module 210 of FIG. 2 to identify potential boundaries of the object displayed in the image 118. The transform module 210 is configured to apply a transform filter to the gradient image 306 that was created during the pre-processing of the image 118. Any of a variety of transform filters can be used, such as a Hough Transform. In implementations, the transform module can apply a modified Hough transform to the gradient image 306. For example, a search area for the Hough transform can be constrained by dividing the input into segments: top left (TL), top right (TR), bottom left (BL), and bottom right (BR). The search area for each boundary can then be restricted to specific segments of the input. For example, to detect lines that potentially represent a top boundary of the object in the image 118, the search area of the transform filter is constrained to the TL and TR segments. This constraint is based on an assumption that the top boundary is likely to start and end in the TL and TR segments, rather than in the BL and BR segments. Similar constraints are implemented for the bottom, left, and right boundaries of the object, as illustrated in Table 1 below.

TABLE 1

| Constraints for Transform Filter | | |
| --- | --- | --- |
| Boundary | Segments | Directional Mask |
| Top | TL, TR | Horizontal |
| Bottom | BL, BR | Horizontal |
| Left | TL, BL | Vertical |
| Right | TR, BR | Vertical |

Table 1 illustrates transform filter constraints that correspond to different boundaries of the object displayed in the image 118. In this example, the object includes top, bottom, left, and right boundaries that are to be detected. In addition, to constraining the search area for each boundary to particular segments, the directionally filtered images, such as outputs 506 and 508, can be used as masks to further increase the accuracy of identifying candidates for a particular boundary. For example, during a line detection algorithm, the transform filter can be forced to only consider black pixels that are in the directionally filtered image, effectively eliminating from consideration any lines that are not likely to be boundaries of the object. For each boundary, one of the directionally filtered images is used as a mask. For example, in the example illustrated in Table 1, a horizontal directional mask is used for identifying the top and bottom boundaries, while a vertical directional mask is used for identifying the left and right boundaries.

In addition, if a new line is substantially similar to another line that was previously identified as a potential boundary line, then the new line is marked as a "supporting line" of the previously identified line. Subsequently, an average slope and an average y-intercept of the previously identified line and corresponding supporting lines can be determined to calculate an average line. This average line can then be used as a potential boundary line. This reduces the total number of potential boundary lines to a smaller set of stronger lines.

Once the transform module 210 has identifies a set of potential lines for each boundary of the object, a rating for each potential boundary line can be calculated. Subsequently, the potential boundary line having the highest rating for a particular boundary is selected to represent that boundary. In implementations, the rating for each potential boundary line can be based upon any of a variety of factors. These factors can be normalized and calculated as a weighted score. Some example factors are used in the following equation to illustrate calculation of the rating for each potential boundary line:

$$\text{Rating} = \frac{wV \cdot rV + wB \cdot rB + wD \cdot rD + wS \cdot rS}{wV + wB + wD + wS}$$

The term rV represents votes for the potential boundary line that are obtained during the transform algorithm. For example, a stronger gradient of the line directly correlates to an amount of votes that will be associated with the line. The term rB represents a number of black pixels in the input gradient image 306 that lie on the potential boundary line. For example, a line that is likely to be a boundary of the object is also likely to have corresponding pixels from the gradient image 306 lie on the line. Since boundaries of a document usually show up as long, nearly unbroken lines in the gradient image, this measure is likely to give such lines a higher rating.

The term rD represents a distance of the potential boundary line from the center of the image. For example, the boundaries of a document are more likely to lie close to the edges of the input image. Consequently, this measure provides a higher rating for lines that are positioned farther away from the center of the image. The term rS represents a number of supporting lines for a potential boundary line. Since substantially similar lines are grouped together as supporting lines, this measure provides a higher score for potential boundary lines with more supporting lines. The terms wV, wB, wD, and wS represent weights that are predetermined, experimentally or otherwise.

The rating for each line represents the likelihood that the line is a boundary of the object. The rating module 212 is configured to select the line having the highest rating in a particular search area as the best candidate for the boundary of the object. In the illustrated example, the rating module 212 provides an output 602 that includes lines 604-610 selected as the boundaries of the object in the image, based on the rating for each line.

Figure 7:
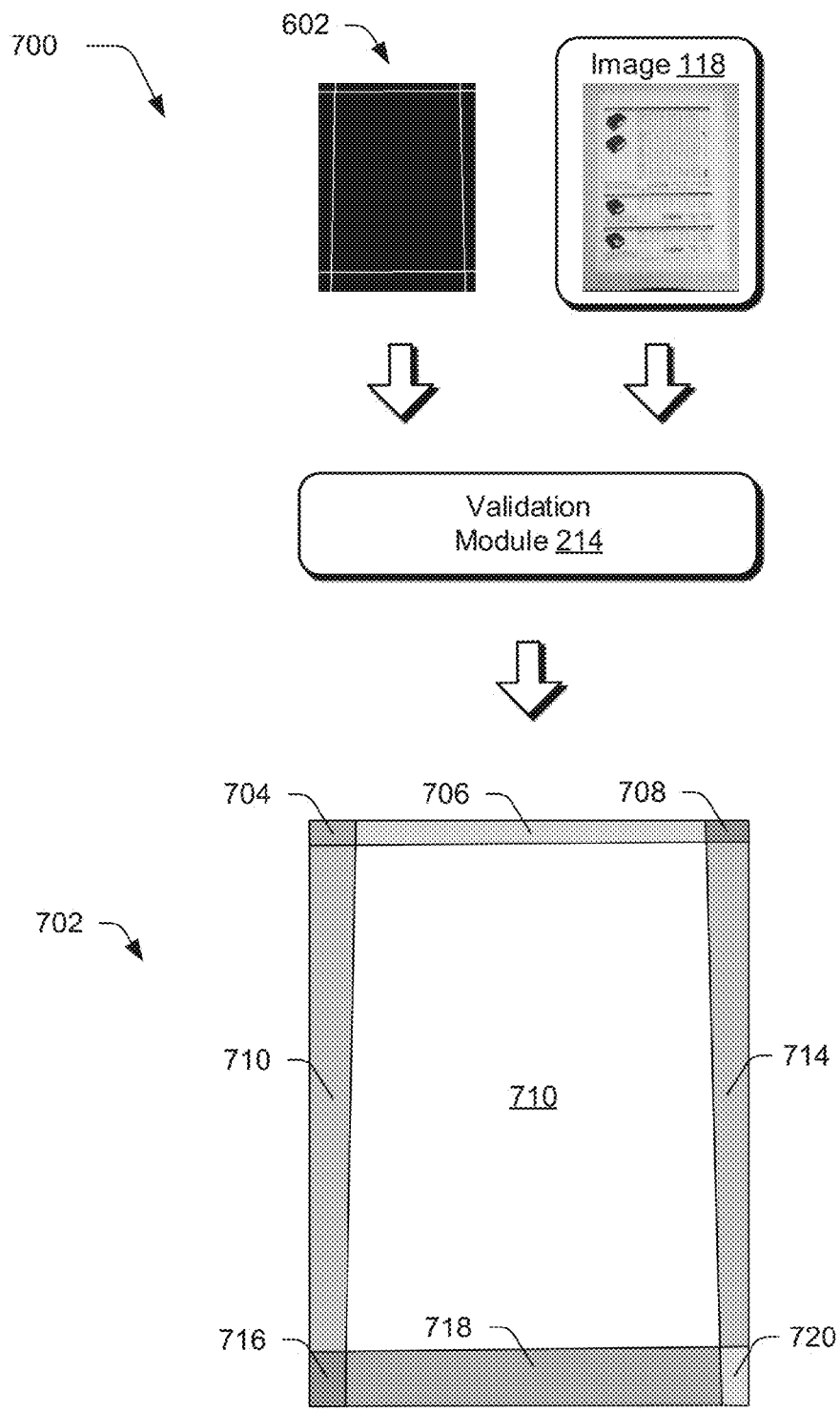
FIG. 7 depicts an example implementation of functionalities represented by a validation module of FIG. 2 to invalidate false boundaries.

FIG. 7 depicts an example implementation 700 of functionalities represented by the validation module 214 of FIG. 2 to invalidate false boundaries. The validation module 214 is configured to associate the lines selected by the rating module 212, such as lines in output 602, with the original image 118 to divide the image 118 into segments. The validation module 214 can then provide an output 702 that includes the image 118 segmented into segments 704-720. Additionally, the validation module 214 is configured to calculate an average color of each segment. For example, the validation module 214 is configured to iterate over the pixels in a segment and calculate the sum of the R, G, and B channel values for the pixels in the segment. Average values for the R, G, and B channels for a segment can be calculated by dividing the sums by the number of pixels in the segment. These average values represent the average color of the segment, and can then be converted into a different color space, such as the CIE-Lab color space.

In the illustrated example, the detected boundaries are determined to be correct if the average color of segment 710 is significantly different from the average color of the other segments. In some instances, however, the image might include only a portion of the document, based on one or more edges of the document being cut off when the image was captured. Consequently, a boundary that is cut off would not be displayed in the image. Conventional boundary detection techniques can incorrectly identify a line on the document as being a boundary, when in fact that boundary is cut off in the image. Using the techniques described herein, however, false boundaries can be invalidated. One such example is illustrated in FIG. 8.

Figure 8:
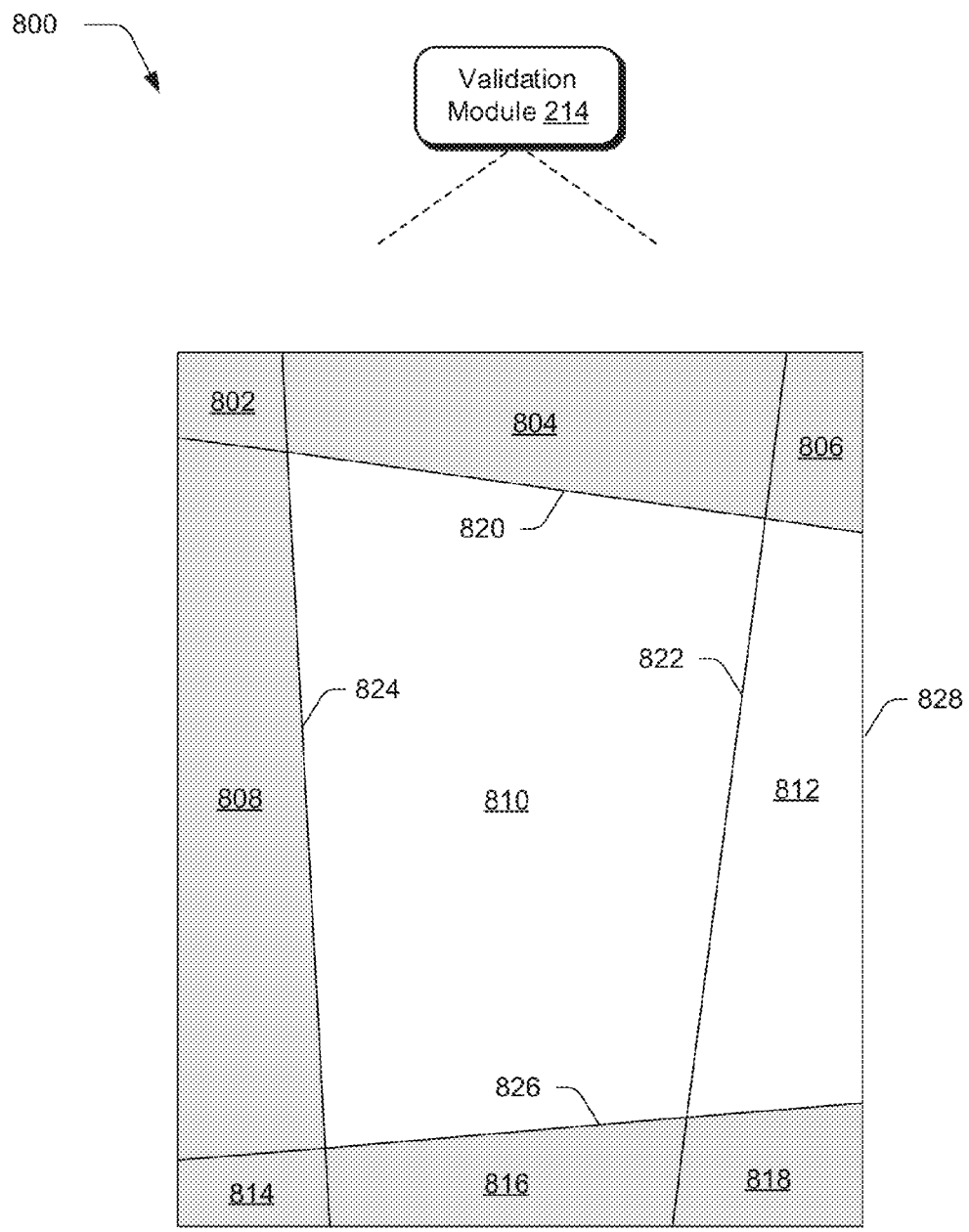
FIG. 8 depicts an additional example implementation of functionalities represented by the validation module of FIG. 2 to invalidate false boundaries.

FIG. 8 depicts an example implementation 800 of functionalities represented by the validation module 214 of FIG. 2 to invalidate false boundaries. The validation module 214 is configured to determine, on a boundary-by-boundary basis, if the average color of the segment in the center of the object is substantially different from the average color of the other segments. A line can be invalidated as being a false boundary based on a violation of this condition. For example, a level of similarity can be determined based on a distance between two colors in a selected color space (e.g., CIE-Lab). In implementations, the distance D can be defined as the Euclidian distance between two colors based on the following equation:

$$D = \sqrt{(L1-L2)^2 + (a1-a2)^2 + (b1-b2)^2}$$

The terms L, a, and b represent dimensions in the CIE-Lab color space in relation to first and second colors associated with first and second segments, respectively. The dimension L represents lightness, and the dimensions a and b represent color-opponent dimensions, based on nonlinearly compressed coordinates.

To determine whether a boundary is valid, consider the example implementation 800 illustrated in FIG. 8. Segments 802-818 each represent a portion of an image. Lines 820-826 have been selected as estimated boundary lines of an object in the image. The validation module 214 can determine if any of the lines 820-826 are false boundaries by using the above equation. For example, to determine whether line 822 is a false boundary, the validation module 214 can calculate $D_1$ for segments 810 and 812. If $D_1$ is greater than a predetermined threshold kMin, then the boundary is valid, because segment 810 would be sufficiently different in color from segment 812 and therefore assumed to not be part of the same object. If, however, $D_1$ is less than kMin, then segments 810 and 812 are not sufficiently different in color, and an additional calculation is made to determine whether line 822 is potentially a false boundary.

Based on $D_1$ being less than kMin, the validation module 214 determines $D_2$ and $D_3$. The term $D_2$ represents the distance between the average colors of segments 810 and 806, and $D_3$ represents the distance D between the average colors of segments 810 and 818. If both $D_2$ and $D_3$ are greater than a predefined threshold kMax, then segments 806 and 818 are sufficiently different from segment 810. Combined with the determination that segments 810 and 812 are sufficiently similar based on $D_1$, an assumption can be made that the segment 812 includes a portion of the same object that is displayed in segment 810. Consequently, the line 822 can be invalidated as being a false boundary of the object. If line 822 is invalid as a boundary, then an edge 828 can be used as a default boundary of the object in the image. If, however, one or both of $D_2$ and $D_3$ are less than kMax, then the line 822 is deemed to be a valid boundary. Further discussion of these and other examples is described in the following and shown in corresponding figures.

Example Procedures

The following discussion describes object boundary detection techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
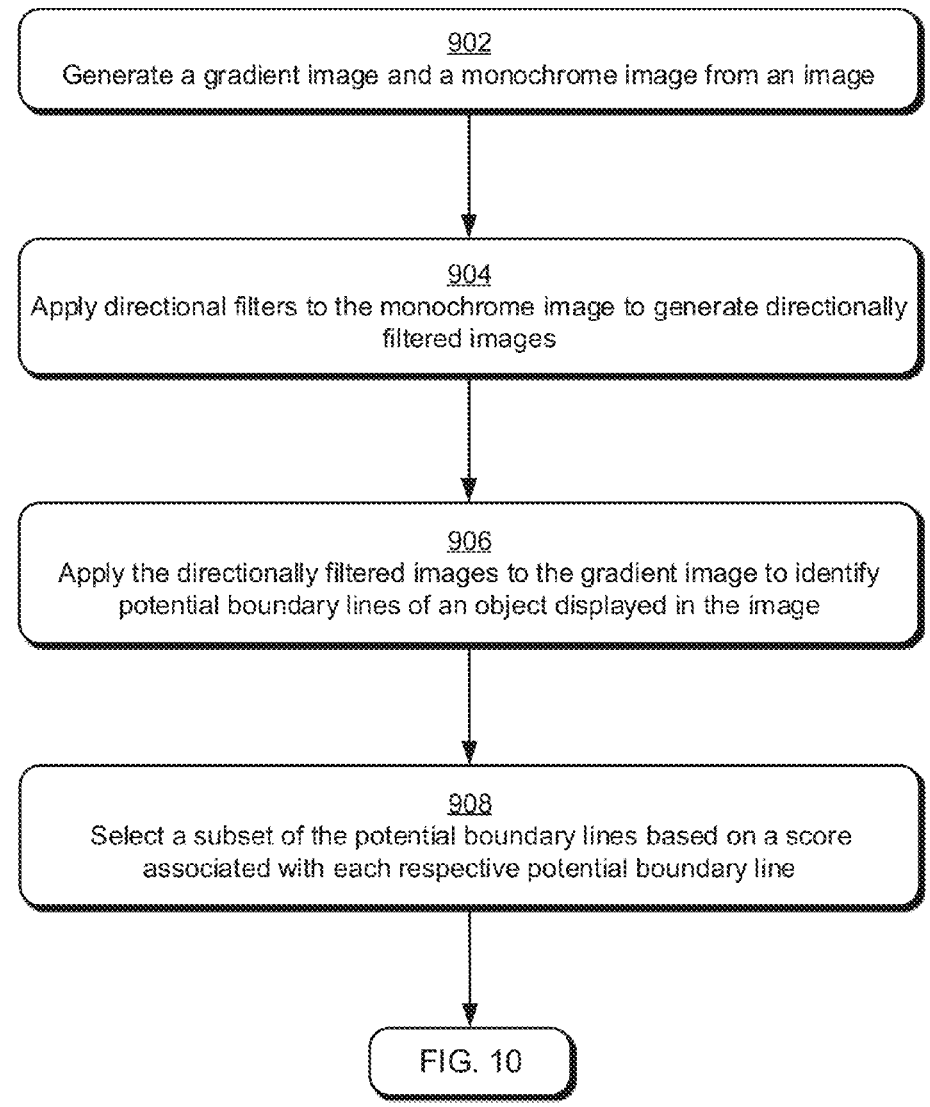
FIG. 9 is a flow diagram depicting a procedure in an example implementation in which object boundary detection techniques are described.

FIG. 9 is a flow diagram depicting a procedure 900 in an example implementation in which object boundary detection techniques are described. A gradient image and a monochrome image are generated from an image (block 902). The gradient image can be generated by applying an edge detection filter to the image. For improved accuracy, the image can be down sampled to an optimum size and filtered with a median filter to remove small features prior to applying the edge detection filter. Any of a variety of edge detection filters can be used, examples of which are described above. The monochrome image can be converted from the gradient image. For example, the contrast of the gradient image can be enhanced to strengthen the gradient. Then, the enhanced gradient image can be converted into the monochrome image.

Directional filters are applied to the monochrome image to generate directionally filtered images (block 904). Each directional filter applied to the monochrome image can provide an output. For example, at least a vertical filter and a horizontal filter are applied when the object in the image is a quadrilateral object, such as a physical document. This is based on the assumption that the edges of the document are substantially vertical or horizontal.

The directionally filtered images are applied to the gradient image to identify potential boundary lines of an object displayed in the image (block 906). This step can be performed in any of a variety of ways. In implementations, a transformation algorithm is applied to the gradient image using the directionally filtered images to constrain a search area of the transformation algorithm. For instance, the search area for each respective boundary can be constrained by a single directionally filtered image. These constraints effectively reduce both resource and time requirements for applying the transformation algorithm by causing the transformation algorithm to only consider black pixels in the directionally filtered image when performing a line detection operation on the gradient image. Additionally, this improves accuracy for boundary detection by eliminating from consideration lines that are not likely to be boundaries of the object displayed in the image.

A subset of the potential boundary lines is selected based on a score associated with each respective potential boundary line (block 908). This step can be performed in any of a variety of ways. For example, each potential boundary line identified in block 908 is assigned a score that represents a likelihood that the potential boundary line is an edge of the object displayed in the image. The score can be based on a variety of factors, examples of which are described above. In implementations, the scores can be compared to one another to identify the relatively highest scores, and then corresponding lines are selected to represent estimated boundaries of the object in the image. If, for example, one end of the object is cut off in the image, the corresponding edge would therefore not be displayed in the image. Accordingly, the estimated boundaries can be evaluated to determine if one or more of the estimated boundaries is a false boundary, as illustrated in FIG. 10.

Figure 10:
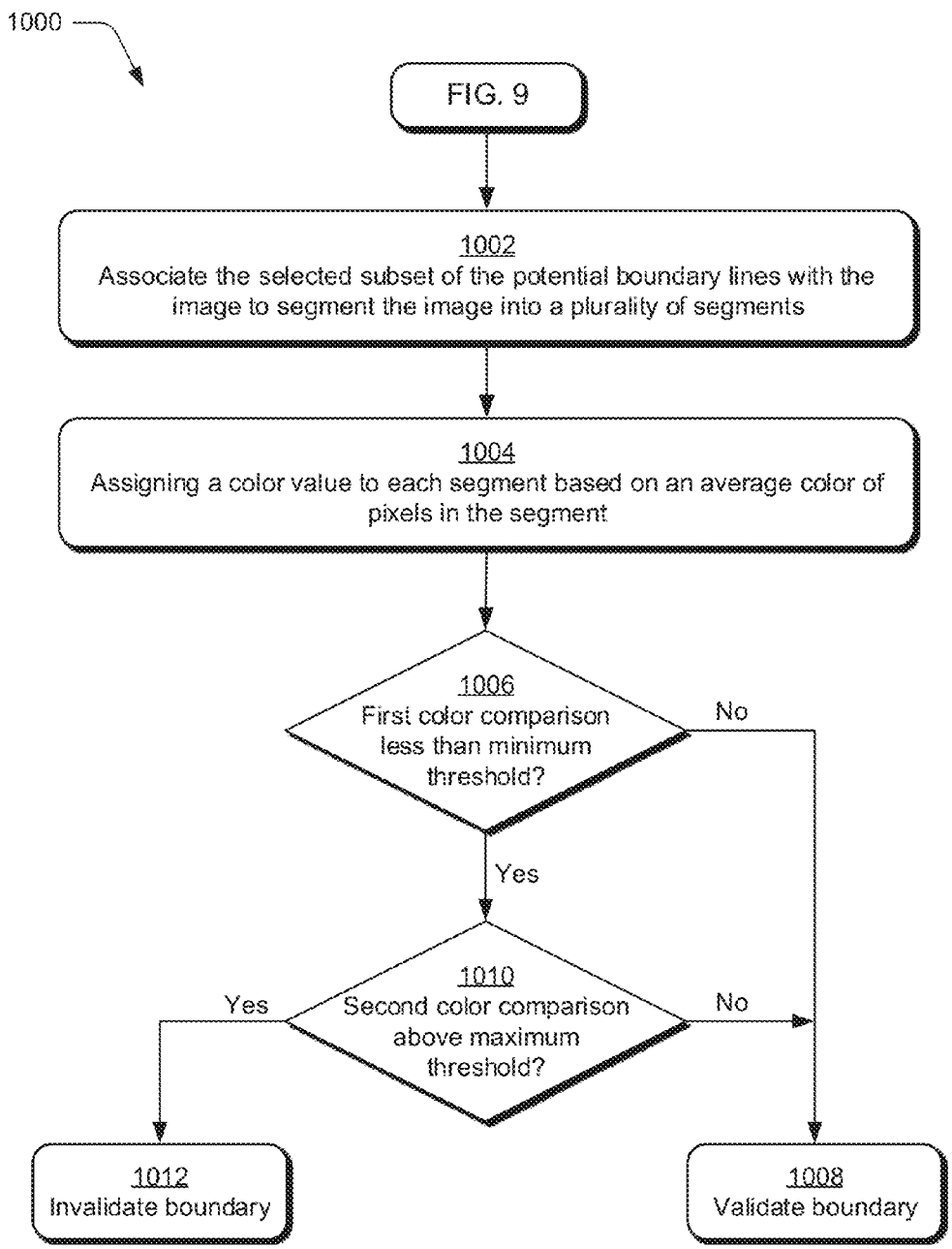
FIG. 10 is a flow diagram depicting a procedure in an example implementation in which object boundary detection techniques are described in further detail in accordance with FIG. 9.

FIG. 10 is a flow diagram depicting a procedure 1000 in an additional example implementation in which object boundary detection techniques are described. The selected subset of the potential boundary lines is associated with the image to segment the image into a plurality of segments (block 1002). For example, assume that the object is a quadrilateral object having two substantially vertical boundaries and two substantially horizontal boundaries. By extending these boundaries, or the corresponding estimated boundaries, to the edge of the image, the image becomes segmented into a maximum of nine segments. These segments can then be used to determine false boundaries of the object in the image.

A color value is assigned to each segment based on an average color of pixels in the segment (block 1004). This step can be performed in any of a variety of ways. In one example, the average color of pixels in each segment can be based on the RBG color model, where the color of each pixel includes a value for each of the R, G, and B channels. In implementations, the average color of the segment can be converted into the CIE-Lab color space for improved accuracy of the procedure.

A determination is made as to whether a first color comparison is less than a minimum threshold (block 1006). For instance, a color value of a center segment that is located at a center of the object in the image is compared to the color value of a segment on the opposing side of the boundary line being evaluated. In implementations, the comparison can be based on the Euclidean distance between the two color values. If the distance is greater than a minimum threshold ("NO" at block 1006) that represents a level of similarity between the two colors, then the segments are determined to be sufficiently different, and the boundary is validated (block 1008).

If, however, the distance is less than the minimum threshold ("YES" at block 1006), then a determination is made as to whether a second comparison is above a maximum threshold (block 1010). For example, the color value of the center segment is compared to the color value of each remaining segment on the opposing side of the boundary line. In implementations, the remaining segments include segments positioned in the corners of the image on the opposing side of the boundary line from the center segment. If one or both of the distances between the center segment's color value and the color value of each of the corner segments is below the maximum threshold ("NO" at block 1010), then the boundary is validated (block 1008). If, however, both of the distances are greater than the maximum threshold ("YES" at block 1010), then the boundary is invalidated (block 1012), and an edge of the image that is nearest to the invalid boundary can then be used as a default boundary for the object.

Example System and Device

Figure 11:
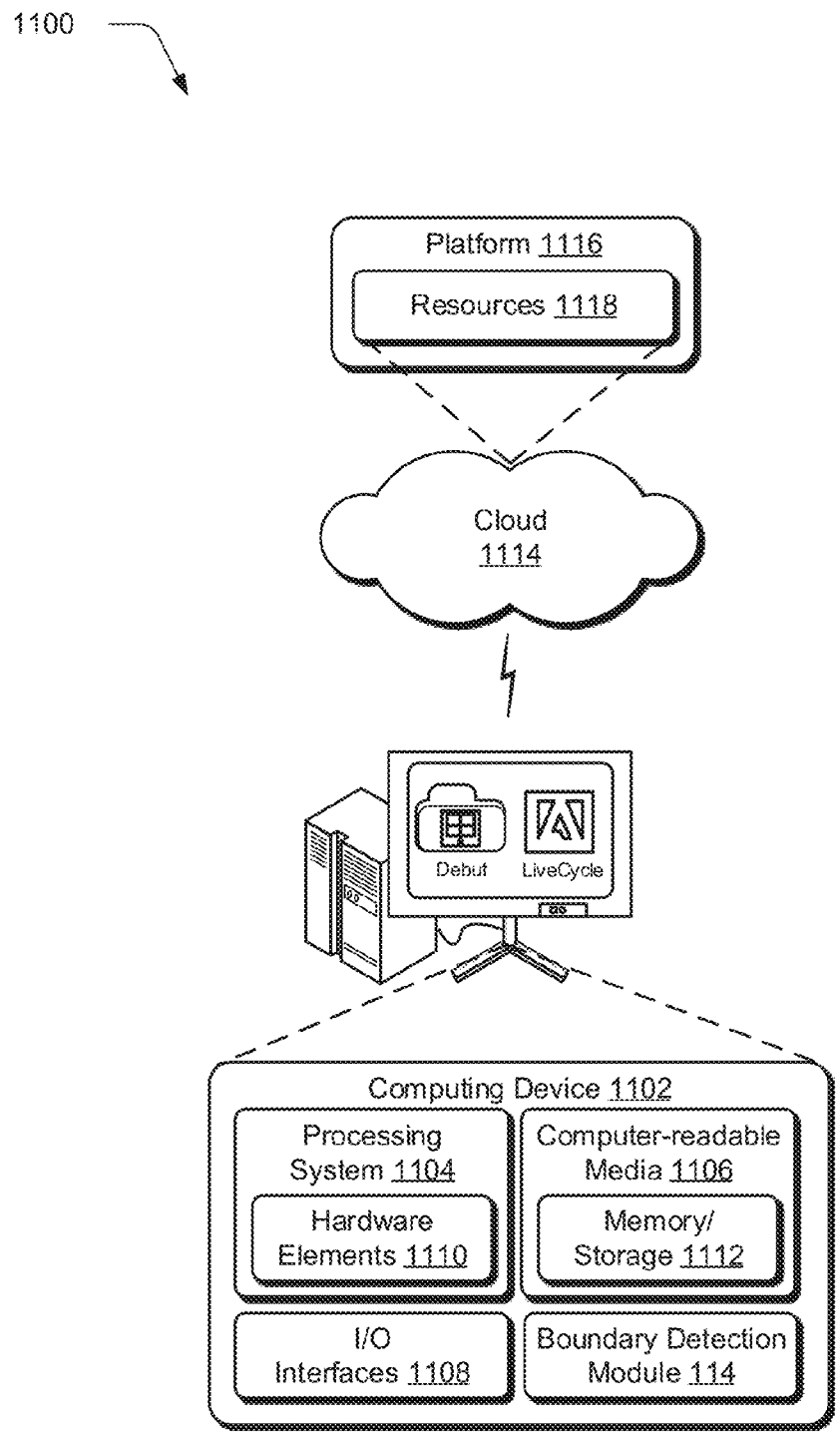
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the boundary detection module 114, which is configured to detect boundaries of an object displayed in an image. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method for detecting edges of an object displayed in an image, the method comprising:
    generating a gradient image and a monochrome image from the image, the gradient image generated with an edge detection filter applied to the image, and the monochrome image generated using the gradient image;
    applying directional filters to the monochrome image to generate directionally filtered images;
    applying the directionally filtered images to the gradient image to identify potential boundary lines of the object displayed in the image; and
    selecting a subset of the potential boundary lines based on a likelihood that each line in the subset of potential boundary lines is an edge of the object displayed in the image.

2. The computer-implemented method of claim 1, wherein
    the object in the image comprises a quadrilateral object.

3. The computer-implemented method of claim 1, wherein
    the object in the image comprises a captured image of a physical document.

4. The computer-implemented method of claim 1, wherein applying the directionally filtered images to the gradient image comprises using the directionally filtered images to constrain a search area of a transformation algorithm applied to the gradient image.

5. The computer-implemented method of claim 1, further comprising:
    enhancing a contrast of the gradient image to generate an enhanced gradient image; and
    wherein generating the monochrome image comprises converting the enhanced gradient image into the monochrome image.

6. The computer-implemented method of claim 1, further comprising removing black pixels of the directionally filtered images that are common to at least two of the directionally filtered images effective to cause the directionally filtered images to have no common black pixels.

7. The computer-implemented method of claim 1, wherein:
    the directionally filtered images include at least a vertically filtered image and a horizontally filtered image; and
    applying the directionally filtered images to the gradient image comprises applying a transformation algorithm to the gradient image based on:
        pixels of the horizontally filtered image determined for identification of top and bottom potential boundary lines of the object; and pixels of the vertically filtered image determined for identification of left and right potential boundary lines of the object.

8. The computer-implemented method of claim 1, further comprising calculating a score for each potential boundary line to represent the likelihood that the potential boundary line is an edge of the object displayed in the image, wherein the score is calculated by at least normalizing a plurality of weighted factors associated with the potential boundary line.

9. The computer-implemented method of claim 1, further comprising:
associating the selected subset of the potential boundary lines with the image to segment the image into a plurality of segments;
assigning a color value to each segment based on an average color of pixels in the segment;
determining that one or more lines of the selected subset of the potential boundary lines is a false boundary based on a comparison of a color value of a center segment that is located at a center of the object in the image to the color value of each segment along the one or more lines; and
responsive to determining that the one or more lines is a false boundary, invalidating the one or more lines as a boundary line.

10. A computer-readable storage device comprising stored instructions that are executable by a computing device to implement a boundary tracking module configured to perform operations comprising:
generating a gradient image and a monochrome image from an image, the gradient image generated with an edge detection filter applied to the image, and the monochrome image converted from the gradient image;
applying at least a vertical directional filter and a horizontal directional filter to the monochrome image to generate a vertically filtered output and a horizontally filtered output, respectively;
applying a transformation algorithm to the gradient image to identify potential boundary lines of an object displayed in the image, the transformation algorithm being applied based on the vertically filtered output and a horizontally filtered output; and
selecting a subset of boundary lines from the potential boundary lines based on a likelihood that the potential boundary line is an edge of the object displayed in the image.

11. The computer-readable storage device of claim 10, wherein the object in the image comprises a captured image of a quadrilateral object.

12. The computer-readable storage device of claim 10, wherein the operations further comprise:
enhancing a contrast of the gradient image to generate an enhanced gradient image; and
wherein generating the monochrome image comprises converting the enhanced gradient image into the monochrome image.

13. The computer-readable storage device of claim 10, wherein the operations further comprise removing black pixels that are common to both the vertically filtered output and the horizontally filtered output effective to cause the vertically filtered output to have no black pixels in common with the horizontally filtered output.

14. The computer-readable storage device of claim 10, wherein applying the transformation algorithm to the gradient image comprises constraining the transformation algorithm based on:

pixels of the horizontally filtered image determined for identification of top and bottom potential boundary lines of the object; and
pixels of the vertically filtered image determined for identification of left and right potential boundary lines of the object.

15. The computer-readable storage device of claim 10, wherein the operations further comprise calculating a score for each potential boundary line to represent the likelihood that the potential boundary line is an edge of the object displayed in the image, wherein the score is calculated based on a normalization of a plurality of weighted factors associated with the potential boundary line.

16. The computer-readable storage device of claim 10, wherein the operations further comprise:
associating the selected subset of the potential boundary lines with the image to segment the image into a plurality of segments;
assigning a color value to each segment based on an average color of pixels in the segment;
determining that one or more lines of the selected subset of the potential boundary lines is a false boundary based on a comparison of a color value of a center segment that is located at a center of the object in the image to the color value of each segment along the one or more lines; and
responsive to determining that the one or more lines is a false boundary, invalidating the one or more lines as a boundary line.

17. A system to detect document boundaries of a document in an image, the system comprising:
a memory configured to maintain the image of the document; and
one or more processors to implement a boundary tracking module that is configured to:
segment the image into a plurality of segments based on estimated boundary lines of the document displayed in the image;
calculate for each segment a color value that corresponds to an average color of pixels in the segment;
determine whether an estimated boundary line is a false boundary based on a comparison of a color value of a center segment that is located at a center of the document displayed in the image to the color value of each segment positioned along the estimated boundary line; and
based on a determination that the estimated boundary line is a false boundary, invalidate the estimated boundary line and use an edge of the image as a default boundary for the document displayed in the image.

18. A system as recited in claim 17, wherein the document in the image comprises a quadrilateral object.

19. A system as recited in claim 17, wherein the comparison is based on a predefined threshold value that represents a level of similarity between the color value of the center segment and the color value of at least one segment located on an opposing side of the estimated boundary line from the center segment.

20. A system as recited in claim 17, wherein the estimated boundary lines are estimated based on:
a gradient image and a monochrome image generated from the image, the gradient image generated with an edge detection filter applied to the image, and the monochrome image converted from the gradient image;

directionally filtered images generated with directional filters applied to the monochrome image;

potential boundary lines of the document displayed in the image that are identified with a transformation algorithm applied to the gradient image based on the directionally filtered images; and a score associated with each respective potential boundary line that represents a likelihood that a potential boundary line is an edge of the document displayed in the image.

* * * * *